United States Patent [19]

Morgan

[11] 4,171,078
[45] Oct. 16, 1979

[54] AUTOMOBILE TRUNK STORAGE RACK

[76] Inventor: Kent D. Morgan, 801 Rainbow Dr., St. Louis, Mo. 63125

[21] Appl. No.: 886,268

[22] Filed: Mar. 13, 1978

[51] Int. Cl.² .............................................. B60R 11/06
[52] U.S. Cl. ........................... 224/42.46 R; 224/42.23; 211/187
[58] Field of Search ................ 224/42.46 R, 42.45 R, 224/42.1 C, 42.43, 42.44, 42.41, 29 R, 42.42 R; 211/41, 208, 187, 186; 248/317, 323, 327, 274; 228/42.12, 42.13, 42.23; 108/108, 149

[56] References Cited
U.S. PATENT DOCUMENTS

| | | | |
|---|---|---|---|
| 2,818,317 | 12/1957 | Little | 224/42.1 C |
| 2,972,418 | 2/1961 | Burns et al. | 211/187 X |
| 3,139,045 | 6/1964 | Rojakovick | 108/149 X |
| 3,635,518 | 1/1972 | Eger | 296/76 |
| 3,685,708 | 8/1972 | Herrington | 224/42.42 R |
| 3,862,696 | 1/1975 | McCauley | 224/42.23 X |

Primary Examiner—Robert J. Spar
Assistant Examiner—Jerold M. Forsberg
Attorney, Agent, or Firm—Cohn, Powell & Hind

[57] ABSTRACT

This adjustable storage rack is mounted within the interior of an automobile trunk and includes front and rear hanger assemblies each comprising a pair of transversely spaced bracket members attached to the trunk upper wall and interconnected by strap members. The hanger assemblies provide support for longitudinally disposed, telescopically related rail members providing bearing surfaces for stored articles. The rack is adjustable lengthwise, widthwise and can also be adjusted with respect to the elevation of the rail members.

9 Claims, 6 Drawing Figures

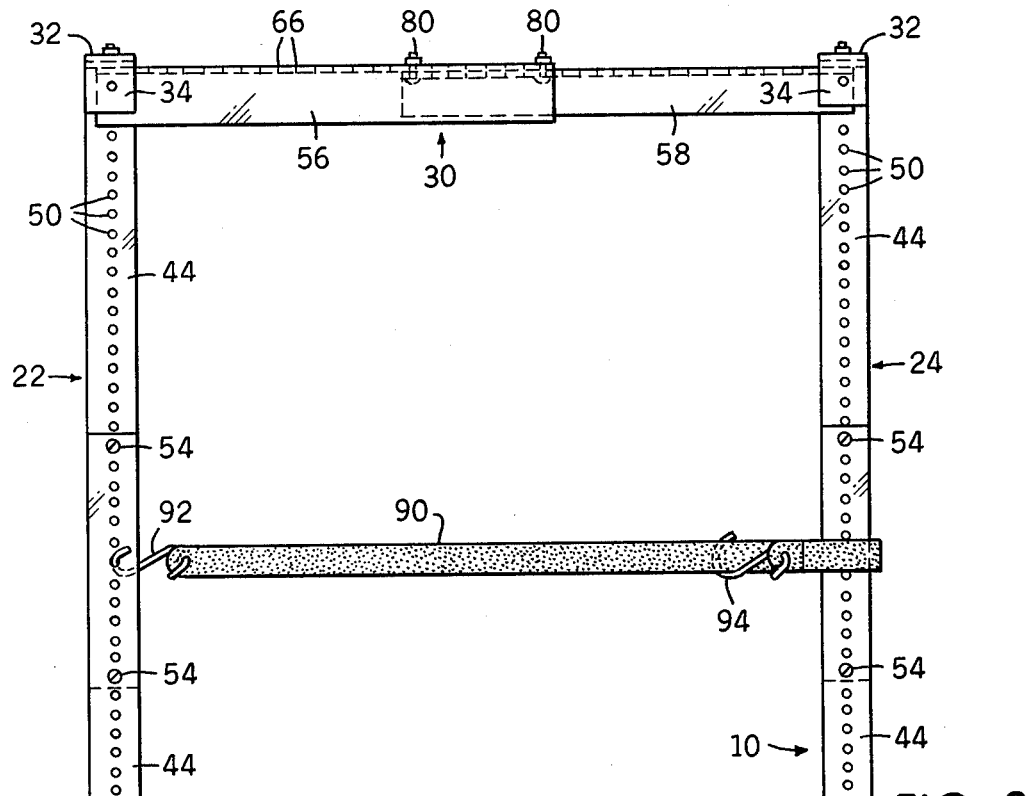
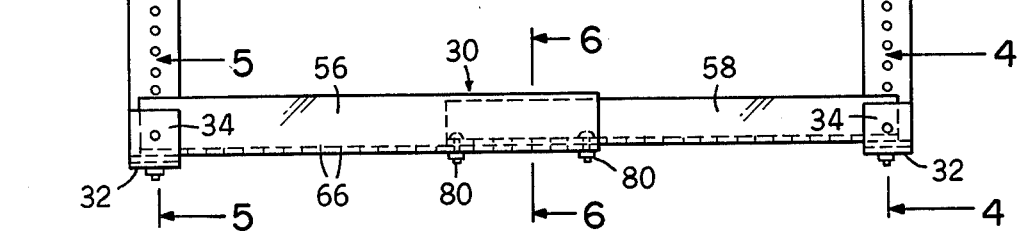
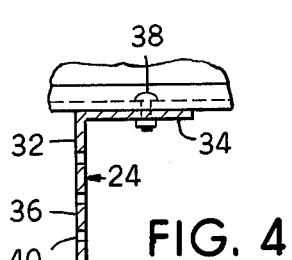
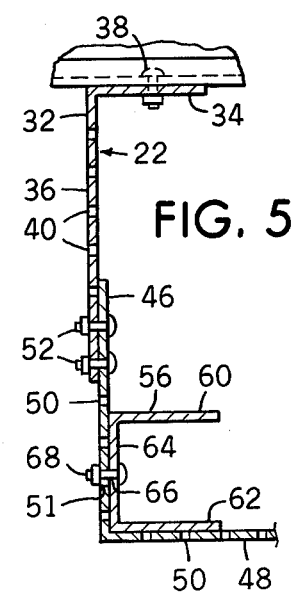
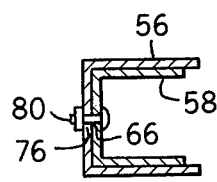

AUTOMOBILE TRUNK STORAGE RACK

BACKGROUND OF THE INVENTION

This invention relates to automobile trunk storage racks and particularly to a storage rack which is adjustable to suit a wide range of automobile trunk sizes and stored articles.

Because of the formation of fender wells, the disposition of the spare wheel, and the hinge mechanism of the trunk lid, it is not possible to utilize the available space within automobile trunks efficiently and much space is wasted, particularly in the area at the rear of the trunk. It is especially difficult to store large, relatively flat articles which are susceptible to damage, particularly if other articles are laid upon them. For example, the storage of articles such as removable roof panels presents a problem because, although they are not voluminous in themselves, they take up a great deal of space when placed in the trunk because of their relatively large length and width dimensions. Further, these articles are expensive and must be treated with care to avoid scratching and breaking.

Several automobile models have removable roof panels and the sizes of these panels vary. In addition the trunk configuration of the associated automobile is also variable. Thus, it any kind of a rack were to be made it would have to be custom made to suit a specific automobile and a specific roof panel size.

The present rack solves the above storage problem in a manner not disclosed by the known prior art.

SUMMARY OF THE INVENTION

This storage rack provides an efficient utilization of automobile trunk storage space and is particularly useful for storing large flat articles.

The rack provides substantially U-shaped front and rear hanger assemblies which support longitudinally extending, transversely spaced rails, the rails providing upper and lower support flanges for carrying the stored articles.

Each hanger assembly includes a pair of transversely spaced, downwardly depending brackets attached to the upper wall of the automobile trunk and having transversely disposed straps extending therebetween.

The straps are formed from a pair of substantially L-shaped strap elements having overlapping horizontal legs connected to each other and vertical end legs overlappingly connectible to the depending brackets.

The downwardly depending brackets include a plurlity of equally spaced connection apertures and the vertical legs of the straps include a plurality of equally spaced connection apertures for selective connection to the brackets to adjustably determine the elevation of said straps.

The horizontal legs of the strap elements include a plurality of connection apertures providing selective connection of the strap elements to each other to adjustably determine the length of the strap members.

The rack provides a pair of rails disposed in side-by side relation which are substantially U-shaped in configuration and include upper and lower bearing flanges connected by a vertical web, said flanges being disposed inwardly of the brackets to receive the stored articles between said brackets.

The rails include front and rear telescopically related elements and the web of each element is provided with a plurality of connection apertures providing selective connection of the rail elements together to adjustably determine the length of the rails.

The rails are connected at their ends to an associated hanger assembly by one of the web apertures and a corresponding strap aperture, and one of said apertures is oversized to facilitate connection of either one of said telescopically related rails to the hanger assembly.

This rack is relatively inexpensive to manufacture, simple to install and particularly effective in use.

BRIEF DESCRIPTION OF THE DRAWINGS

FIG. 3 is a plan view of the storage rack;

FIG. 4 is an enlarged sectional view taken on line 4—4 of FIG. 3;

FIG. 5 is a cross-sectional view taken on line 5—5 of FIG. 3; and

FIG. 6 is a sectional view taken on line 6—6 of FIG. 3.

DESCRIPTION OF THE PREFERRED EMBODIMENT

Figure 1:
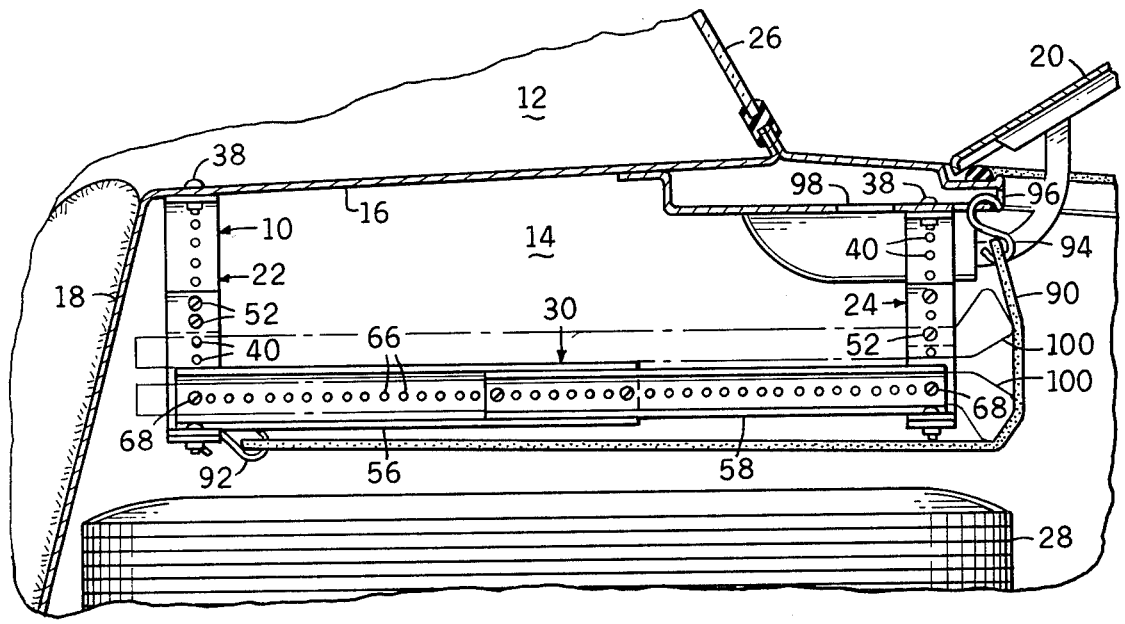
FIG. 1 is a longitudinal sectional view of the storage rack as mounted in an automobile.
Figure 2:
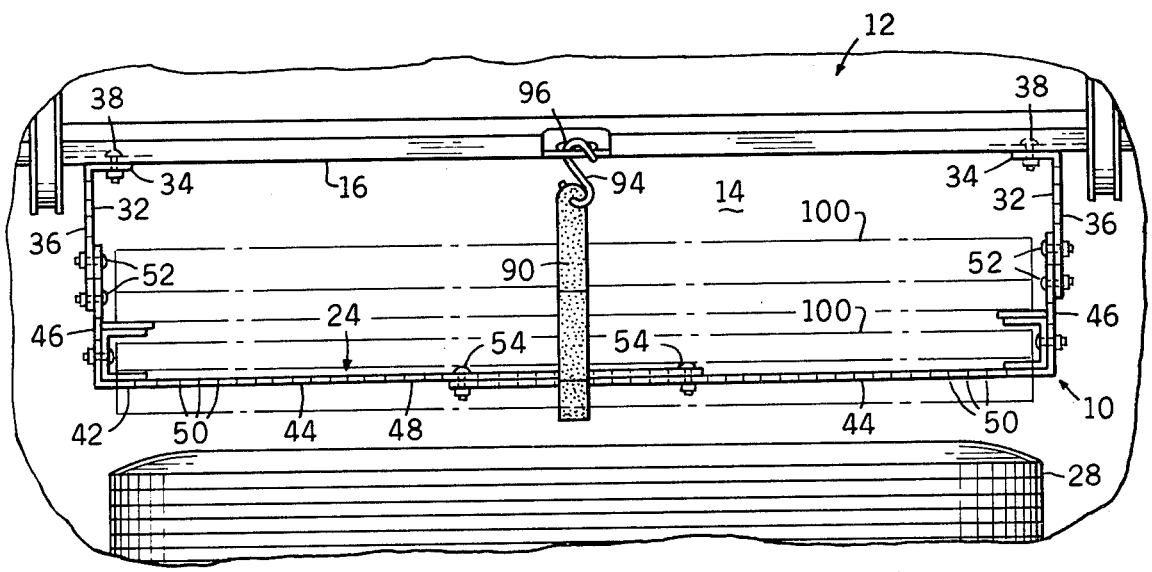
FIG. 2 is an end view of the storage rack.

Referring now by reference numerals to the drawings and first to FIGS. 1 and 2, it will be understood that the storage rack, which is generally indicated by numeral 10, is mounted within the trunk 14 of an automobile generally indicated by numeral 12. As shown in FIG. 1 the trunk 14 is defined in part by an upper wall 16, a side wall 18 and a hinged trunk lid 20. The storage rack 10 in the embodiment shown is mounted to the upper wall 16.

The storage rack 10 includes front and rear hanger assemblies 22 and 24 respectively mounted in longitudinally spaced relation to each other on either side of the automobile rear window 26. The front and rear hanger assemblies 22 and 24 are substantially U-shaped and provide a seat for a pair of longitudinally extending rails 30 disposed in side-by-side relation and disposed above the spare wheel 28.

In the preferred embodiment the front and rear hanger assemblies 22 and 24 are formed from identical components and, as shown in FIG. 2 with reference to the rear hanger assembly 24, each assembly includes a pair of transversely spaced L-shaped brackets 32 having a horizontal upper leg 34 and a downwardly depending vertical leg 36. The upper leg 34 is apertured to receive a fastener 38 by which the bracket 32 is attached to said upper wall 16 and the depending leg 36 includes a plurality of equally spaced apertures 40. The brackets 32 are transversely interconnected by a strap 42 which includes a pair of L-shaped strap elements 44 having vertical legs 46 and horizontal legs 48. The vertical and horizontal legs 46 and 48 each include a plurality of equally spaced apertures as clearly shown in FIGS. 3, 4 and 5. The vertical legs 46 are selectively connected to the depending bracket legs 36 as by a pair of fasteners 52 and the horizontal legs are overlappingly connected to each other by a pair of fasteners 54.

The rails 30 include telescopically related front and rear rail elements 56 and 58 respectively. As shown in FIG. 5 the front rail elements 56 each include upper and lower flanges 60 and 62 interconnected by a web 64 having a plurality of longitudinally disposed, equally spaced apertures 66 including an end aperture which is connected to the associated strap element vertical leg 46 as by a fastener 68. The strap aperture through which the fastener 68 passes is, in the preferred embodiment, an elongated or oversize hole designated by numeral 51 which facilitates connection of the rail 56 to the front hanger assembly 22 as will be described below. As shown in FIG. 4 the rear rail members 58 are substantially similar to rail members 56 in that they each include upper and lower flanges 70 and 72 interconnected by a web 74 having a plurality of longitudinally disposed, equally spaced apertures 76 including an end aperture which is connected to the associated strap element vertical leg 48 of the rear hanger assembly 24 by means of a fastener 68 passing through the oversize hole 51 provided in said strap vertical leg 46. As shown in FIG. 6 the U-shaped, channel rail elements 56 and 58 are sized so that the rail element 58 fits within the rail element 58 in nested relation. The longitudinally extending web apertures 66 and 76 are disposed along the web axis in each case so that said apertures may be placed in register and rail elements 56 and 58 are connected by means of fasteners 80.

In the preferred embodiments of the storage rack 10 the four bracket members 32 and the four strap elements 44 are identical. The use of an enlarged aperture 51 in the vertical leg 46 of each strap member 44 permits the front and rear rail elements 56 and 58 to be disposed in seated relation on their associated strap elements even though the distance from the upper side of the strap element horizontal leg 48 to the line of holes 66 and 76 is different for the connection of the front hanger 22 and the rear hanger 24. As will be readily understood the same effect could be achieved by providing an oversize end aperture in rail elements 56 and 58.

The storage rack 10 is particularly useful for receiving and storing large flat articles. Such articles are exemplified by the removable roof panels or so-called T-bar panels provided on some automobiles. Such roof panels are indicated in FIGS. 1 and 2 by numerals 100 and are typically elongate, having turned up ends which when received within vinyl covers assume the general configuration shown in phantom outline. As indicated in FIG. 2 the rail members 56 and 58 are disposed with the webs outermost so that the flanges are directed inwardly to provide elongate bearing ledges receiving and holding the roof panels 100.

Importantly, the roof panels 100 are held in place by means of an elastic member, known as a shock cord, and indicated by numeral 90. The shock cord 90 includes hook attachments 92 and 94 at the opposite ends thereof. Hook 92 is attachable to the front frame 22 as by slipping said hook through a pair of apertures 50 provided in the overlapped strap members 44. Hook 94 is attachable to a portion of the automobile such as one of the cut-outs 96 and 98 provided in the upper wall 16. Alternatively, a connection member (not shown) such as an upper strap extending between the transversely disposed brackets 32 of the front hanger 24 can be provided to which the hook 94 can be attached. FIG. 3 shows the shock cord 90 doubled back over the rear strap and connected to itself when not in use.

It is thought that the structural features of this storage rack 10 have become fully apparent from the foregoing description of parts, but for completeness of disclosure the installation and use of the rack will be briefly described.

It will be readily understood that the trunk arrangement for almost all automobiles is different to some degree. This storage rack is provided with adjustment features that render it capable of being used for automobiles having a wide range of different trunk dimensions and for flat storage articles such as removable roof panels of variable size. The structural arrangement of parts provides that the adjustment features are substantially 3-dimensional. For example, the provision of equally spaced connection registrable apertures 40 in the depending leg 36 of the brackets 32 and equally spaced registrable connection apertures 50 in the vertical leg 46 of the straps 44 permits individual elevational adjustment of the corners of the rack. The provision of equally spaced registrable connection apertures 50 along the strap element horizontal legs 48 permits transverse adjustment of the rack, and the provision of equally spaced registrable connection apertures 66 and 76 in the rail elements 56 and 58 respectively permits longitudinal adjustment.

When the rack is desired for use for storing T-bar roof panels, for example, the rack can be pre-assembled by attaching the strap elements 44 together to suit the width of such panels and by attaching the rail elements 56 and 58 together to suit the length of such panels. Following this, the brackets 32 can be attached to the strap elements and the position of the bracket connection fasteners can be marked on the upper trunk wall 16. The necessary connection apertures can then be drilled and the brackets 32 attached to said wall as by fasteners 38. The front fasteners 38 is readily accessible from the interior of the automobile and the rear fastener 38 is readily accessible from a cut-out such as that indicated by numeral 98 through the double wall common to most automobiles. With this type of connection neither fastener is exposed to the weather. The open framework nature of the rack 10 which relies on the rails 30 to carry the weight of the panels, and relies on the straps 42 to provide ties between said rails, facilitates the installation procedure. The result is a simple rack consisting of brackets 32 providing front and rear portions of oppositely disposed depending bracket means attached to the trunk upper wall and interconnected transversely by straps 44, the rail elements 56 and 58 providing longitudinally extending bearing means for receiving flat articles. The upper and lower bearing surfaces provided by the rails are admirably suited to receive a pair of roof panels 100 and the shock cord 90 holds such panels securely in place. It will however be understood that if desired a sheet of plywood or the like (not shown) can be supported on the rails to facilitate storage of items other than removable roof panels.

I claim as my invention:

1. A storage rack for an automobile trunk having an upper wall, said rack comprising:
   (a) a first hanger means including:
      (1) a pair of transversely spaced oppositely disposed brackets operatively attached to the upper wall of said trunk, each bracket including a downwardly depending leg,
      (2) a transversely disposed strap having upwardly extending legs each connected to an associated bracket leg, and
   (b) a second hanger means disposed in longitudinally spaced relation from said first hanger means, said second hanger means including:
      (1) a pair of transversely spaced oppositely disposed brackets operatively attached to the upper wall of said trunk, each bracket including a downwardly depending leg, and (2) a transversely disposed strap having upwardly extending legs each attached to an associated bracket leg, and (c) a pair of longitudinally extending rails disposed in spaced, side-by-side relation and carried by said first and second hanger means, each rail including:

(1) a first rail element connected at one end to said first hanger means, (2) a second rail element connected at one end to said second hanger means, (3) said first and second rail elements being connected together in lengthwise adjustable relation, and (4) each rail having upper and lower flanges and having a vertical web therebetween.

2. An automobile trunk storage rack as defined in claim 1, in which:

(d) each of said straps includes a pair of overlappingly related strap elements having a plurality of lengthwise spaced apertures, and (e) fastener means are provided between at least two pairs of registered apertures for lengthwise adjustable connection of said strap elements.

3. An automobile trunk storage rack as defined in claim 1, in which:

(d) said first and second rail elements are overlappingly related and each of said elements includes a plurality of lengthwise spaced apertures, and (e) fastener means are provided between at least two pairs of registered apertures for lengthwise adjustable connection of said rail elements.

4. An automobile trunk storage rack as defined in claim 1, in which:

(d) the depending leg of each of said brackets includes a plurality of lengthwise spaced apertures, (e) the upwardly extending leg of each strap element is overlappingly related to an associated depending bracket leg and includes a plurality of lengthwise spaced apertures, and (f) fastener means are provided between at least two pairs of registered apertures for lengthwise adjustable connection of said bracket and strap.

5. An automobile trunk storage rack as defined in claim 1, in which:

(d) the upwardly extending ends of each strap include a connection aperture, (e) the end of each rail includes a connection aperture, and (f) a single fastener interconnects said rail and said strap through said aperture and one of said apertures is larger than the other of said apertures so that the same connection can be used for the front or rear rail.

6. An automobile trunk storage rack as defined in claim 2, in which:

(f) said front and rear brackets are identical, and (g) said front and rear strap elements are identical.

7. An automobile trunk storage rack as defined in claim 1, in which:

(d) said rail flanges extend inwardly to provide upper and lower bearing ledges for receiving flat storage articles thereupon.

8. An automobile trunk storage rack as defined in claim 1, in which:

(d) the first hanger means defines an open end, (e) first and second connection points are provided in the vicinity of the first and second hanger means, said second connection point being disposed at the upper portion of said open end, and (f) an elastic shock cord is provided having attachment means at each end, one of said attachment means being connectible to the first attachment point and the other of said attachment means being connectible to the second attachment point whereby the shock cord extends substantially across the open end defined by the first hanger means to hold stored articles in place.

9. A storage rack for an automobile trunk having an upper wall, said rack comprising:

(a) a first hanger means including:

(1) a pair of transversely spaced oppositely disposed brackets operatively attached to the upper wall of said trunk, each bracket including a downwardly depending leg, (2) a transversely disposed strap having upwardly extending legs each connected to an associated bracket leg, and (b) a second hanger means disposed in longitudinally spaced relation from said first hanger means said second hanger means including:

(1) a pair of transversely spaced oppositely disposed brackets operatively attached to the upper wall of said trunk, each bracket including a downwardly depending leg, and (2) a transversely disposed strap having upwardly extending legs each attached to an associated bracket leg, and (c) a pair of longitudinally extending rails disposed in side-by-side relation and carried by said first and second hanger means, each rail including vertically spaced inwardly extending flanges providing upper and lower bearing ledges for receiving flat storage articles thereupon.

* * * * *